Patented June 2, 1953

2,640,753

UNITED STATES PATENT OFFICE 2,640,753

STERILIZING AIR

Harold B. Morris and Courtland B. Meuser, Ashland, Ohio

No Drawing. Application February 7, 1950, Serial No. 142,935

8 Claims. (Cl. 21—53)

This invention relates to reduction of pathogenic airborne organisms within a limited space, whether entirely confined or only partially confined, by diffusing therein an effective concentration of vapors of a bactericidal and/or viricidal agent at room temperature.

There has been great interest recently in the possibility of sterilizing the air in offices, plants and homes by various glycols; for instance, propylene glycol, triethylene glycol, etc. Aerosols of such materials are reported to effectively inactivate pathogenic air-borne organisms such as those which produce colds, influenza, tuberculosis, etc. It has also been reported that breathing air containing these glycols for several hours develops a residual effect (an antibiotic factor). This effect is alleged to provide a period of immunity in untreated air, normally contaminated, making it possible for a person to be resistant to infection throughout the twenty-four hours even though he breathed treated air for only a portion of the twenty-four-hour period.

In spite of the unbelievable possibilities of improved health for humanity, wide-spread use of the glycols has been retarded because of the nature of the glycols themselves. Their vapor pressures are so low at room temperatures (from less than 0.01 to 0.07 mm. of mercury at 20° C.) that expensive devices are required to heat and circulate the vapor. The vapors of these chemicals, once produced, condense more or less rapidly at room temperature above the vaporizer and exist in vapor form within only a relatively short distance of the vaporizing equipment. A mist of the glycols—whether produced by aspiration or by condensation of the vapor, or otherwise—settles rapidly. This necessitates repeated or continuous replacement of the mist, and the mist which settles leaves a greasy residue about the room which is very objectionable.

According to this invention a bactericidal and/or viricidal agent is employed which has a higher vapor pressure than the glycols, but a vapor pressure sufficiently low to prevent rapid, undesirable evaporation. The vapor pressures of the agents to which this invention relates lie within the range of 0.08 and 10 millimeters of mercury at 20° C. Some of the preferred agents are given in the following table, together with their vapor pressures:

| Bactericidal Agents | Vapor Pressure |
| --- | --- |
| Ethylene glycol mono-methyl ether | 6.2 mm. of Hg at 20° C. |
| Ethylene glycol mono-ethyl ether | 3.8 mm. of Hg at 20° C. |
| Ethylene glycol mono-butyl ether | 0.6 mm. of Hg at 20° C. |
| Diethylene glycol mono-methyl ether | 0.2 mm. of Hg at 20° C. |
| Diethylene glycol mono-ethyl ether | 0.22 mm. of Hg at 20° C. |

It appears that an ether linkage adjacent to a hydroxyl-containing carbon may be the effective portion of the organic molecule. A strong affinity for water also seems essential. As will be evident to a bacteriological chemist, other glycol compounds and derivatives thereof having a vapor pressure within this range may be found to have an improved physiological effect. Thus, by substituting or adding groups, an undesirable effect of a compound may be lessened or eliminated, or the beneficial effect enhanced. It is obvious that improved materials having vapor pressures within the stated range may be considered the equivalent of the materials listed in the table, for the purposes of this invention. The time required for the preparation and evaluation of all such related materials has made it impossible to complete tests thereon at the present time. It seems probable that not only will more effective agents be found but also agents with specific effectiveness on the different pathogenic organisms.

The prior art of air sterilization has very definitely directed all technical effort in the direction of vapor pressures below those of the alkylene glycols with the specified thought that a lower saturation value in air is the more promising goal to attain. This invention departs radically from prior art thinking in that we provide "therapeutic concentrations" of our agents without thermal or mechanical means—such means are necessary to carry out the requirements of earlier art. By means of a careful selection and/or blends of the proper agent or agents having vapor pressures within the range of 0.08 to 10.0 mm. of mercury at 20° C., two purposes of the invention are accomplished. (1) A concentration of agent lethal to bacterium, virus, mold, fungus or other pathogenic organism is simply and practically obtained. (2) Simultaneously, the vapor pressure limits prevent the diffusion of concentrations above those desired, viz., concentrations are kept below levels toxic to humans, below dangerous explosive or flammable limits, and within the practical range of cost efficiency.

Prior art in bactericide and/or viricide dispersion has resulted in aerosols, mists or droplets the size of which is 1 micron or larger. This invention provides dispersion of agent in particles of molecular dimension, hundreds of times smaller than microns. Such molecular dispersion offers many advantages, such as; persistence, enhanced reactivity and lack of condensation.

Bactericidal and viricidal agents having the desired vapor pressure may be used alone or mixed with one another or absorbed in or mixed with any suitable carrier medium. Thus the bactericidal and/or viricidal agent may be mixed with a perfume or deodorant or other ingredient that volatilizes from a wick simultaneously with it. It may be mixed with a less volatile carrier medium which may be dispersed as an aerosol and produce nuclei from which the bactericidal agent is evaporated in unimolecular form.

Though our preferred embodiment of the invention contemplates the evaporation of the bactericidal and/or viricidal agent into the room of a house or an office or the like from a wick, it is understood that other means for facilitating its evaporation may be utilized, such as any fibrous or cellular base material which is capable of being saturated with it. In houses and other buildings equipped with heating or cooling devices which employ a forced draft of air the bactericidal agent may advantageously be evaporated into the circulating air from the blower or other equipment for distribution throughout the building. The evaporating equipment may be located within the air circulation ducts but preferably will be located within the room or rooms of the building in which the vapors are desired. A single wicking device may be used in a normal room. In a larger space and in office buildings, etc., two or more wicking devices will be employed, as required, in order to maintain an effective concentration of the bactericidal and/or viricidal agent in the air of the space to be protected.

A preferred bactericidal and/or viricidal agent is ethylene glycol mono-butyl ether. This may be used effectively for substantial sterilization of the air with or without admixture with any glycol or other glycol derivative or other diluent or carrier. A single bottle of this bactericidal agent provided with a glass fiber wick 3/8 inch in diameter, with one end immersed in the agent in the bottle and the other end extending about 1/2 inch out of the bottle, may be used in a room of normal size with satisfactory results. The rate of evaporation and the concentration of agent is practically controlled at room temperature by the vapor pressure of agent, the amount of wick exposed and the number of hours of the day during which it is exposed. We prefer to expose the wick continuously to overcome losses due to leakage and convection. In our testing we have found that approximately four ounces of ethylene glycol mono-butyl ether evaporated continually from a wick, as described, will provide the desired conditions in an average room for longer than three months, provided the air is reasonably confined within the room.

The vapor pressure of ethylene glycol mono-butyl ether and other bactericidal and/or viricidal agents having a vapor pressure within the range of 0.08 to 10 mm. of mercury at 20° C. is such that these materials evaporate at room temperature from a wick or by blowing or otherwise forcing a stream of air over a container of the material absorbed in cotton or other carrier, or by aspirating it, or by spraying it, or by dispersion with Freon or other gas under pressure, or in any other suitable manner. For individual use an inhaler may be employed which may be of any usual design and preferably contains cotton as the absorbent material in which the bactericidal agent is absorbed and from which the agent may be withdrawn by inhaling.

An effective purifying concentration for reducing or entirely eliminating air-borne pathogenic organisms from a confined or partially confined space is about one part of vapor of the agent or mixture thereof in about 200,000 to 50 million parts of air. It is not necessary that such concentrations be maintained, and a higher concentration may be built up at intervals with a lower intervening concentration, or with substantially no vapor at all between intervals of changing concentrations.

This application is a continuation-in-part of our application Serial No. 97,318 filed June 4, 1949.

What we claim is:

1. A method of inactivating large percentages of pathogenic air-borne organisms within an air space which is at least partially confined, which comprises maintaining in said space over a substantial period of time, at room temperature, a concentration in each two hundred thousand to fifty million parts of air of one part of a glycol ether having a vapor pressure of 0.08 to 10 mm. of mercury at 20° C.

2. The method of claim 1 in which the glycol ether is an ether of ethylene glycol.

3. The method of claim 1 in which the glycol ether is ethylene glycol mono-butyl ether.

4. The method of claim 1 in which the glycol ether is an ether of diethylene glycol.

5. A method of inactivating large percentages of pathogenic air-borne organisms within an air space which is at least partially confined, which comprises maintaining in said space over a substantial period of time, at room temperature, a concentration in each two hundred thousand to fifty million parts of air of one part of a glycol ether from a mixture containing a substantial amount of a glycol and a substantial amount of a glycol ether having a vapor pressure of 0.08 to 10 mm. of mercury at 20° C.

6. The method of claim 5 in which the glycol ether is an ether of ethylene glycol.

7. The method of claim 5 in which the glycol ether is ethylene glycol mono-butyl ether.

8. The method of claim 5 in which the glycol ether is an ether of diethylene glycol.

HAROLD B. MORRIS.
COURTLAND B. MEUSER.

References Cited in the file of this patent

UNITED STATES PATENTS

| Number | Name | Date |
|---|---|---|
| 2,326,672 | Paschal | Aug. 10, 1943 |
| 2,333,124 | Robertson et al. | Nov. 2, 1943 |
| 2,344,536 | Coey et al. | Mar. 21, 1944 |
| 2,369,900 | Jennings et al. | Feb. 20, 1945 |
| 2,422,145 | Taylor | June 10, 1947 |

OTHER REFERENCES

"J. Soc. Chem. Inc." (London), volume 66, pages 48 to 50 (1947), and volume 67, page 69 (1948).